United States Patent

Kim

(10) Patent No.: US 6,833,530 B2
(45) Date of Patent: Dec. 21, 2004

(54) FLUX CORED WIRE FOR GAS SHIELDED ARC WELDING

(75) Inventor: Jongwon Kim, Changwon (KR)

(73) Assignee: Kiswel, Ltd., Youngnam (KR)

( * ) Notice: Subject to any disclaimer, the term of this patent is extended or adjusted under 35 U.S.C. 154(b) by 0 days.

(21) Appl. No.: 10/118,154

(22) Filed: Apr. 9, 2002

(65) Prior Publication Data

US 2003/0052112 A1 Mar. 20, 2003

(30) Foreign Application Priority Data

Apr. 9, 2001 (KR) ........................................ 2001-18700

(51) Int. Cl.$^7$ .............................................. B23K 35/02
(52) U.S. Cl. ................................ 219/145.22; 219/146.1
(58) Field of Search ........................ 219/145.22, 145.1, 219/146.1, 146.24, 146.32, 146.52

(56) References Cited

FOREIGN PATENT DOCUMENTS

| EP | 0798070 | A2 | 10/1997 | | |
|---|---|---|---|---|---|
| EP | 798070 | * | 10/1997 | ......... | B23K/35/368 |
| JP | 58016796 | | 6/1981 | | |
| JP | 63171295 | | 1/1987 | | |
| JP | 63273594 | | 4/1987 | | |
| JP | 03291192 | | 4/1990 | | |
| JP | 3-291192 | * | 4/1990 | ......... | B23K/35/368 |
| JP | 03294093 | | 4/1990 | | |
| JP | 05269592 | | 3/1992 | | |
| JP | 5-269592 | * | 3/1992 | ......... | B23K/35/368 |
| JP | 05269593 | | 3/1992 | | |
| JP | 4-309492 | * | 11/1992 | ......... | B23K/35/368 |
| JP | 07164184 | | 12/1993 | | |
| JP | 07276088 | | 4/1994 | | |
| JP | 08099193 | | 9/1994 | | |
| JP | 09201697 | | 1/1996 | | |
| JP | 09262693 | | 3/1996 | | |
| JP | 9-262693 | * | 3/1996 | ......... | B23K/35/368 |
| JP | 09277087 | | 4/1996 | | |
| JP | 09277088 | | 4/1996 | | |
| JP | 10291092 | | 4/1997 | | |

* cited by examiner

*Primary Examiner*—M. Alexandra Elve
(74) *Attorney, Agent, or Firm*—Bacon & Thomas, PLLC

(57) ABSTRACT

Disclosed is a flux cored wire for gas shielded arc welding, which is capable of offering excellent workability and providing a weld metal with an improved impact value at low temperature. The flux cored wire for gas shielded arc welding is characterized in that a titania-based flux composition is filled into a sheath for mild steels of low-carbon steels, and the flux composition contains 4.0 to 8.0% $TiO_2$, 1.0 to 3.0% Mn, 0.1 to 1.0% Si, 0.002 to 0.02% B, 0.2 to 0.45% Mg and 0.15 to 0.3% Al, by weight relative to the total weight of the wire.

1 Claim, 1 Drawing Sheet

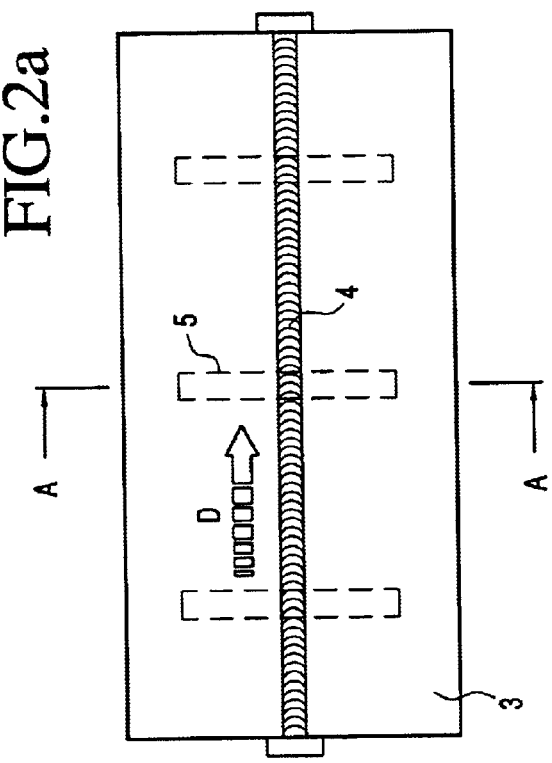
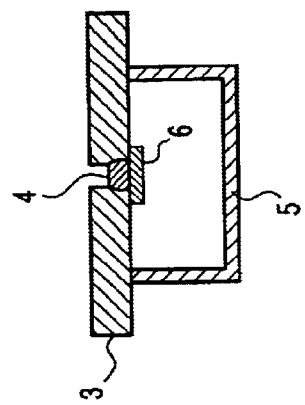
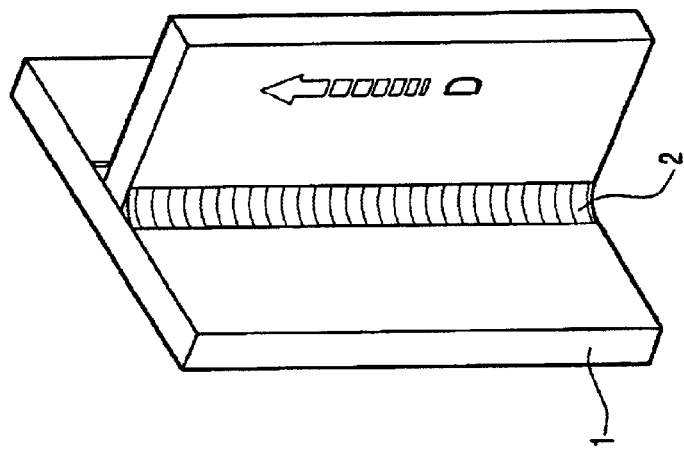

FLUX CORED WIRE FOR GAS SHIELDED ARC WELDING

BACKGROUND OF THE INVENTION

1. Field of the Invention

The present invention relates to a flux cored wire, and more particularly to a flux cored wire for gas shielded arc welding, which is filled with a titania-based flux composition and employs carbon dioxide or a mixture of carbon dioxide and argon as a shield gas.

2. Description of the Related Art

In general, titania-based flux cored wires have been mainly applied to fabricate mild steels and high tensile strength steels having a tensile strength of 50 kgf/mm$^2$ or more. Although the titania-based flux cored wires provide very excellent workability, there is a disadvantage in that upon low-temperature welding or high heat input welding, such conventional wires provide weld metals with poor impact toughness.

Indeed, the application of such titania-based flux cored wires has problems in ship fabrications, since the grade III of ship steel standards is strictly specified with respect to the impact values of metals(that is, more than 55 J at −20), and in steels for a low temperature use, such as aluminum killed steels (that is, more than 28 J at −40 to −50).

Meanwhile, using cored wires filled with a basic flux, such problems could be overcome. However, although weld metals have a satisfactory impact value at low temperature, some problems still remain, including that welding in all positions is unstable in terms of workability, and welding spatter and fume generation are increased.

SUMMARY OF THE INVENTION

Therefore, the present invention has been made in view of the above problems, and it is an object of the present invention to provide a flux cored wire for gas shielded arc welding, which is capable of offering excellent workability and providing a weld metal with an improved impact value at low temperature.

In accordance with the present invention, the above and other objects can be accomplished by the provision of a flux cored wire for gas shielded arc welding, characterized in that a titania-based flux composition is filled into a sheath for mild steels of low-carbon steels, and the flux composition contains 4.0 to 8.0% TiO$_2$, 1.0 to 3.0% Mn, 0.1 to 1.0% Si, 0.002 to 0.02% B, 0.2 to 0.45% Mg and 0.15 to 0.3% Al, by weight relative to the total weight 100% of the wire.

More preferably, the content ratio of Mg to Al may be 1.45 to 1.55.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a perspective view showing a test plate for welding in a vertical upward position to test a welding workability, with respect to examples of the invention and comparative examples;

FIG. 2a is a plan schematic of a test plate used for testing high temperature cracks in a welded portion, with respect to examples of the invention and comparative examples; and FIG. 2b is a sectional schematic as viewed from the plane of the line A—A in FIG. 2a.

DESCRIPTION OF THE PREFERRED EMBODIMENTS

In accordance with the invention, a flux composition is filled inside a sheath for mild steels and is compounded of arc stabilizers, slag forming agents, deoxidizing agents and alloy additives, with respective functions thereof.

Under the consideration of a covering property and fluidity of slag, as an oxide, the TiO$_2$ component should be contained in the flux composition in an amount of 4.0 to 8.0% by weight, relative to the total weight of the wire.

As for the deoxidizing agents, Fe-Mn, Me-Mn and other Mn alloy irons are added to the flux composition, such that the total Mn amount is in a range of 1.0 to 3.0% by weight, relative to the total weight of the wire.

Taking account of a deoxidizing power and viscosity of slag, Fe-Si, Fe-Si-B and the like are incorporated, such that the total Si amount is in a range of 0.1 to 1.0% by weight, relative to the total weight of the wire. On the other hand, B should be adjusted to a weight of 0.002 to 0.02%, relative to the total weight of the wire. With such a proportion of the components in the flux composition, the covering property and fluidity of slag remain constant, thereby making possible stable welding in all positions, and further improving an impact value at low temperature.

In addition, with an aim of improving an arc stability and bead shape, Mg and Al are incorporated. The content ratio of Mg to Al (i.e., Mg/Al) should meet Equation 1 below, thus improving the arc stability and improving power of concentration of the arc. Further, Mg and Al are effective to further improve the above-described properties of the above flux composition, whereby the welding in all positions can be performed in a convenient manner. Also, they can provide the weld metal with much more improved impact toughness at low temperature.

[Equation 1]

$$1.45 \leq Mg/Al \leq 1.55$$

Sources of Mg and Al include Mg-Al, Me-Mg, Fe-Al, Me-Al and the like.

Next, with regard to the flux composition of the invention, the reasons that the contents of its components are numerically limited will be described in detail.

A main component of the titania-based flux composition, TiO$_2$, is of high importance, acting as a slag forming agent and an arc stabilizer. It gives both an excellent covering property and detachability of the slag, even though such properties are uncommon to other slag forming agents.

However, with TiO$_2$ at less than 4.0% by weight relative to the total weight of the wire, it fails to obtain good appearance and shape of a bead. Also, poor slag coverage is obtained, and the arc stability is deteriorated, while the amount of spatter generation increases. On the other hand, if the content of TiO$_2$ exceeds 8.0% by weight, the slag generation is excessive, thickening the slag layer. Moreover, TiO$_2$ can remain as a non-metal inclusion, upon slag floating over a molten pool, or it increases a risk of slag inclusion in the weld metal.

As a source material for TiO$_2$, rutile sand, reduced ilmenite, titanium oxide or leucoxene may be used.

Mn is incorporated as a deoxidizing agent, and also to play an additional role of reducing the oxygen content in the weld metal, thereby improving low temperature toughness.

However, if the content of Mn is less than 1.0% of the total weight of the wire, the deoxidizing ability is not sufficient, so the arc is made unstable, or the blowholes are easily formed. On the other hand, if Mn is over 3.0%, the strength of the weld metal is outside of the specified standard for the application, or high temperature cracks easily occur.

Therefore, it is preferred that the content of Mn is set to 1.0 to 3.0%, relative to the total weight of the wire. The source material may be Fe-Mn, Me-Mn, Si-Mn and the like.

Si is also effective as a deoxidizing agent so as to reduce the oxygen content in the weld metal. Si is oxidized to $SiO_2$ slag with good fluidity and a covering property. The slag viscosity can be adjusted so as to make easier welding in a vertical upward position.

However, if the content of Si is less than 0.1% relative to the total weight of the wire, the deoxidizing ability is not sufficient, causing welding defects such as generation of blowholes. Due to a poor coverage and viscosity of the slag, the applicability to a welding work in a vertical upward position is lowered. On the other hand, if it is over 1.0%, the content of Si in the weld metal increases, promoting creation of a sigma phase, thereby deteriorating low temperature toughness. Accordingly, care should be taken to prevent such dysfunctional effects of Si from being exerted. Further, in a course of welding, the amounts of spatter and welding fume generation can be increased. For this reason, it is preferred that the Si content is limited to 1.0% or less. The source material may be Fe-Si, Fe-Si-Mn or the like.

B is an element that makes the structure of a weld metal fine, having an effect of improving low temperature toughness. The amount employed should be specially noted, since if the B content is over a limited range, the weld metal is rapidly hardende, causing high temperature cracking.

Thus, the limiting range of the B amount is preferably 0.002 to 0.02% by weight, relative to the total weight of the wire.

Mg serves as an arc stabilizer and a strong deoxidizing agent. It is converted into MgO inside the arc, via its rapid oxidation. MgO increases a solidifying point of the slag, making possible a good weld appearance without a rough bead surface in a vertical upward welding position.

However, if the content of Mg is less than 0.2% relative to the total weight of the wire, its effects are little exerted. On the other hand, if it is over 0.45%, the amount of spatter generation is increased, and slag formation is weakened, thereby worsening the bead shape. Thus, the Mg content should be limited to 0.2 to 0.45 w %, relative to the total weight of the wire.

Al also plays a role as a deoxidizing agent. With a combination of functions of Fe-Mn and Fe-Si, it helps slag formation and prevents the molten metal from flowing away. However, if the Al content is over 0.3 w %, relative to the total weight of the wire, the bead shape is worsened. Such an Al content adversely affects arc formation and lowers low temperature toughness of the weld metal. Thus, it is preferred that the Al content should be 0.15 to 0.3 w %, relative to the total weight of the wire.

In accordance with the invention, to improve weldability in all welding positions and make a vertical upward position more convenient for welding, the mixing ratio of Mg and Al should be more than 1.45 and less than 1.55. By employing such a ratio, welding efficiency due to arc stability can be improved, and it is possible to obtain a metal with a low temperature toughness of more than 50 J which is applicable to aluminum killed steels at −40

With an adequate combination of Mg and Al, the functions of other deoxidizing agents can be boosted. Moreover, such a combination allows an adjustment of a melting point of slag, thereby being excellent in its applicability in all welding positions. However, if the ratio of Mg and Al departs from the range of the invention, though ratios of other components meet the compositions for a flux of the invention, the beneficial effects of Mg and Al are likely to be significantly decreased.

Hereinafter, the examples according to the present invention will be described in detail, as compared with comparative examples.

Specimens were prepared, provided that the examples are wires whose components of the flux composition and the proportions thereof are in the limiting range according to the invention. For comparative examples, the specimens are made, provided that at least one component is contained in the flux in a proportion outside the scope of the present invention.

A variety of flux compositions, relative to examples or comparative examples, are represented in Table 1.

Specimens having different flux compositions with a filling rate of 15% in the sheath, and having a diameter of 1.2 mm were prepared and evaluated.

Using the wires thus prepared, test plates were subjected to welding under the welding conditions represented in Table 2. Tests were performed to assess arc stability amounts of spatter and fume generation and slag detachability.

TABLE 1

Flux compositions

| | Specimen | $TiO_2$ | Mn | Si | Al | Mg | B | Mg/Al |
|---|---|---|---|---|---|---|---|---|
| Ex. | 1 | 6 | 2.5 | 0.3 | 0.2 | 0.3 | 0.005 | 1.5 |
| | 2 | 6 | 2 | 0.3 | 0.2 | 0.3 | 0.005 | 1.5 |
| | 3 | 6 | 2.5 | 0.4 | 0.15 | 0.22 | 0.005 | 1.47 |
| | 4 | 6.5 | 2.5 | 0.4 | 0.15 | 0.22 | 0.005 | 1.47 |
| | 5 | 6.5 | 2 | 0.55 | 0.15 | 0.23 | 0.005 | 1.53 |
| | 6 | 6.5 | 2 | 0.55 | 0.18 | 0.27 | 0.005 | 1.5 |
| | 7 | 7 | 2 | 0.55 | 0.18 | 0.27 | 0.005 | 1.5 |
| | 8 | 7 | 2 | 0.6 | 0.22 | 0.34 | 0.005 | 1.55 |
| Comp. | 9 | 6 | 0.5 | 0.3 | 0.25 | 0.3 | 0.005 | 1.2 |
| Ex. | 10 | 8.4 | 1.5 | 0.3 | 0.2 | 0.3 | 0.005 | 1.5 |
| | 11 | 3.6 | 2.5 | 0.4 | 0.2 | 0.22 | 0.005 | 1.1 |
| | 12 | 6.5 | 2 | 1.4 | 0.1 | 0.23 | 0.005 | 2.3 |
| | 13 | 6.5 | 2 | 0.3 | 0.1 | 0.3 | 0.005 | 3 |
| | 14 | 4 | 2.5 | 0.4 | 0.15 | 0.3 | 0.005 | 2 |
| | 15 | 7 | 2.5 | 0.5 | 0.2 | 0.34 | 0.03 | 1.7 |
| | 16 | 7 | 2 | 0.5 | 0.2 | 0.3 | 0.03 | 1.5 |

Note: The weight % is based on the total weight of the wire.

TABLE 2

Welding condition

| Parameters | Welding conditions | |
|---|---|---|
| Test plate material | Rolled steels for welding structures SM490A | |
| Test plate material dimensions | thickness 12, width 100, length 300 | |
| Welding position | Flat and horizontal fillet | Vertical upward welding |
| Welding current (A) | 260–340 | 200–240 |
| Welding voltage (V) | 28–35 | 24–25 |
| Welding speed ( /min) | 40 | 15–20 |
| Shield gas | 100% $CO_2$ | |
| Shield gas flow rate | 20 l/min | |

Further, in a vertical upward welding position, a T-shaped test plate illustrated in FIG. 1 was subjected to a continuous build-up of a bead (in FIG. 1, the numerals 1 and 2 denotes a base metal, a weld bead, respectively, and D denotes a welding direction). Several parameters including a flowing amount of a weld metal in welding and drooping of the bead were observed with the naked eye and evaluated. The results are shown in Table 3.

TABLE 3

Welding results

| Specimen | | Horizontal fillet position | | | | Vertical upward position | | | |
|---|---|---|---|---|---|---|---|---|---|
| | | Arc stability | spatter generation | fume generation | Bead Shape | Arc stability | spatter generation | fume generation | Bead Shape |
| Ex. | 1 | | | | | | | | |
| | 2 | | | | | | | | |
| | 3 | | | | O | | | | O |
| | 4 | O | | O | O | O | O | | O |
| | 5 | | O | O | O | O | | | |
| | 6 | | O | O | | | | | |
| | 7 | O | | O | | | O | | |
| | 8 | O | O | O | | | O | O | |
| Comp. Ex. | 9 | | O | O | | | O | O | X |
| | 10 | O | O | O | | | O | O | |
| | 11 | O | O | O | X | O | O | O | X |
| | 12 | X | | | | X | X | | |
| | 13 | O | O | | X | O | O | | X |
| | 14 | O | O | O | | O | O | | X |
| | 15 | O | O | | O | O | O | | * |
| | 18 | | O | O | O | O | O | O | *O |

Note: The evaluation of welding performance is as follows: : very good, O: good, : slightly poor, X: poor.
*susceptible to cracking in a root-layer(first layer) or crater of the weld.

To evaluate properties of weld metals, test plates were manufactured according to the procedures of American welding Society (AWS) standard, under the welding conditions shown in Table 4. The mechanical and physical tests of the weld metals were performed.

For testing high temperature cracks in the weld metals, the test plates as illustrated in FIGS. 2a and 2b, which is a kind of steel similar to the plates for mechanical and physical tests, were manufactured. Giving 6 mm of a root gap, welding was performed at a welding speed of 24 cm/min using 250 A/31 V. After slag was removed by a liquid penestration technique, it was determined whether the bead cracks appear or not (in FIGS. 2a and 2b, the numerals 3, 4 and 5 denote test plate, weld bead, a restraining base and a backing of ceramic material, respectively, and D denotes a welding direction).

The results of testing tensile strength, cold impact and high temperature cracks are shown in Table 5.

TABLE 4

Welding conditions

| Parameter | Welding condition |
|---|---|
| Test plate steels | Rolled steels for welding structures SM490A |
| Test plate dimensions | Thickness 19, width 150, length 300 |
| Groove angle | 45° |
| Root space | 12 |
| Numbers of pass and layer | 17 passes 6 layers |
| The temperature between layers | 150 |
| Shield gas | 100% $CO_2$ or 80% Ar + 20% $CO_2$ |
| Welding current | 240 to 260 A |
| Welding voltage | 26 to 30 V |

TABLE 5

Properties of weld metal

| | Specimen | Tensile strength( f/ ) | Impact value at −40 (J) | Cracks at high temperature |
|---|---|---|---|---|
| Ex. | 1 | 580 | 53.8 | No |
| | 2 | 590 | 54 | No |
| | 3 | 590 | 56 | No |
| | 4 | 605 | 54 | No |
| | 5 | 605 | 53.6 | No |
| | 6 | 620 | 55 | No |
| | 7 | 620 | 55 | No |
| | 8 | 620 | 54 | No |
| Comp. Ex. | 9 | 540 | 24 | No |
| | 10 | 560 | 23 | Yes |
| | 11 | 590 | 48 | Yes |
| | 12 | 680 | 21 | Yes |
| | 13 | 610 | 48 | No |
| | 14 | 600 | 42 | No |
| | 15 | 620 | 56 | Yes |
| | 16 | 620 | 54 | Yes |

As can be seen from Table 1, the wires of examples 1 to 8, in which the proportions of the chemical components for respective flux compositions were within a limiting range according to the present invention. They exhibited good welding workability and produced very good bead appearance without drooping or flowing of the weld metals even in a vertical upward position.

As revealed in tests analyzing properties of the weld metals, the finished metals had a satisfactory tensile strength, and also as for cold impact values, the metals meet the specified AWS standards at −40.

As for the test for high temperature cracks, good results were obtained in which the weld metals did not generate cracks in their weld bead.

On the other hand, with regard to the comparative wires in which at least one component in the flux composition is outside the scope of the present invention in terms of its composition and proportion, welding workability was poor. In addition, satisfactory impact values of the weld metals, which are evaluated as one of mechanical and physical properties, were not reached.

In particular, as for the wires of comparative example 9, as a deoxidizing agent, Mn was deficient, and the ratio of Mg/Al was out of the range defined in the present invention. The welding employing such a wire increased the occurrence of blowholes due to insufficient deoxidization, and lowered arc stability, and reduced welding efficiency because of the occurrence of bead droops in a vertical upward position. As for the wires of comparative example 10, welding workability was substantially good, but cold impact property fails to meet the requirements. The shape of bead, also, was somewhat rough.

As for the wire of comparative example 11, the amount of $TiO_2$ and the ratio of Mg/Al were out of the range defined in the present invention. Slag coverage was bad due to deficiency of the amount of slag, and bead droops occurred in a vertical upward position due to insufficient viscosity of the melt slag.

Finally, as for the wires of comparative examples 12 to 15, the ratio of Mg/Al were out of the range defined in the present invention. The amount of fume generation was increased, and the bead was driven toward one corner, adversely affecting the weldability. Especially, as for the examples 15 and 16, the occurrence of cracks in the weld bead at high temperature was increased due to the excess amount of B added.

As described in the above, the flux cored wire for gas shielded arc welding according to the invention offers excellent workability in all welding positions and can provide a weld metal with good low temperature toughness.

Further, such a flux cored wire has effects of making welding efficiency excellent, providing good shape of the bead, arc stability, and minimizing the amount of spatter generation.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A flux cored wire for gas shielded arc welding, characterized in that a titania-based flux composition is filled into a sheath for low-carbon mild steels, and the flux composition contains 4.0 to 8.0% $TiO_2$, 1.0 to 3.0% Mn, 0.1 to 1.0% Si, 0.002 to 0.02% B, 0.2 to 0.45% Mg and 0.15 to 0.3% Al, by weight relative to the total weight of the wire, wherein a content ratio of Mg to Al is 1.45 to 1.55.

* * * * *